United States Patent
Kawabata

[11] Patent Number: 5,808,774
[45] Date of Patent: Sep. 15, 1998

[54] METHOD OF CORRECTING CURVATURE OF IMAGE SURFACE AND OPTICAL BEAM SCANNING APPARATUS FOR USE WITH THE SAME

[75] Inventor: Motonobu Kawabata, Kyoto, Japan

[73] Assignee: Dainippon Screen Mfg. Co. Ltd., Kyoto, Japan

[21] Appl. No.: 715,547

[22] Filed: Sep. 19, 1996

[30] Foreign Application Priority Data

Sep. 22, 1995 [JP] Japan ..................................... 7-244435
Oct. 31, 1995 [JP] Japan ..................................... 7-283506

[51] Int. Cl.[6] ................................................. G02B 26/08
[52] U.S. Cl. ........................ 359/210; 359/205; 359/207; 359/212; 359/213; 359/214; 359/216
[58] Field of Search ..................................... 359/205–219, 359/900; 347/258–261; 250/234–236

[56] References Cited

U.S. PATENT DOCUMENTS

| | | | |
|---|---|---|---|
| 4,547,038 | 10/1985 | Mori | 359/214 |
| 4,941,719 | 7/1990 | Hisada et al. | |
| 5,054,866 | 10/1991 | Tomita et al. | 359/201 |
| 5,134,511 | 7/1992 | Shiraishi et al. | 359/196 |

FOREIGN PATENT DOCUMENTS

| | | |
|---|---|---|
| 465136 | 6/1991 | European Pat. Off. . |
| 599542 | 11/1993 | European Pat. Off. . |

OTHER PUBLICATIONS

*Patent Abstracts of Japan*, vol. 13, No. 007 (P–810) 10 Jan. 1989; JP–A–63 216018, Sep. 8, 1988.

*Patent Abstracts of Japan*, vol. 8, No. 038, (P–255), 18 Feb. 1984; JP–A–58 190920, Nov. 8, 1983.

*Primary Examiner*—James Phan
*Attorney, Agent, or Firm*—Ostrolenk, Faber, Gerb & Soffen, LLP

[57] ABSTRACT

In an optical beam scanning apparatus in which an optical beam from a light source impinges upon a deflecting system and a deflected optical beam from said deflecting system scans a surface-to-be-scanned through a scanning lens in a main scanning direction, with a curvature of image surface correction method of the present invention, curvature of image surface is reduced without improving the surface accuracy of the scanning lens. A lens holder (14) is freely movable on an optical base (3) along a guide (15). When an adjustment screw (16) is manipulated, the lens holder (14) is moved so that a collimator lens (12) is moved along an optical axis (OA) and positioned. As the collimator lens (12) is moved, the degree of parallel of an optical beam which is emitted toward a galvanometer (30) is changed and the shape of an image surface is adjusted, so that the image surface is positioned within the depth of focus of the optical beam scanning apparatus over an entire scanning range. Hence, it is possible to perform drawing with an excellent image quality.

17 Claims, 13 Drawing Sheets

METHOD OF CORRECTING CURVATURE OF IMAGE SURFACE AND OPTICAL BEAM SCANNING APPARATUS FOR USE WITH THE SAME

BACKGROUND OF THE INVENTION

1. Field of the Invention

The present invention relates to a method of correcting curvature of an image surface which is created in an optical beam scanning apparatus in which an optical beam from a light source impinges upon a deflecting system and a surface-to-be-scanned is scanned through a scanning lens with the light beam which is deflected by the deflecting system in a main scanning direction, and also relates to an optical beam scanning apparatus for such a method.

As herein termed, curvature of image surface refers to curvature of image surface in a main scanning direction.

2. Description of the Prior Art

Figure 13:
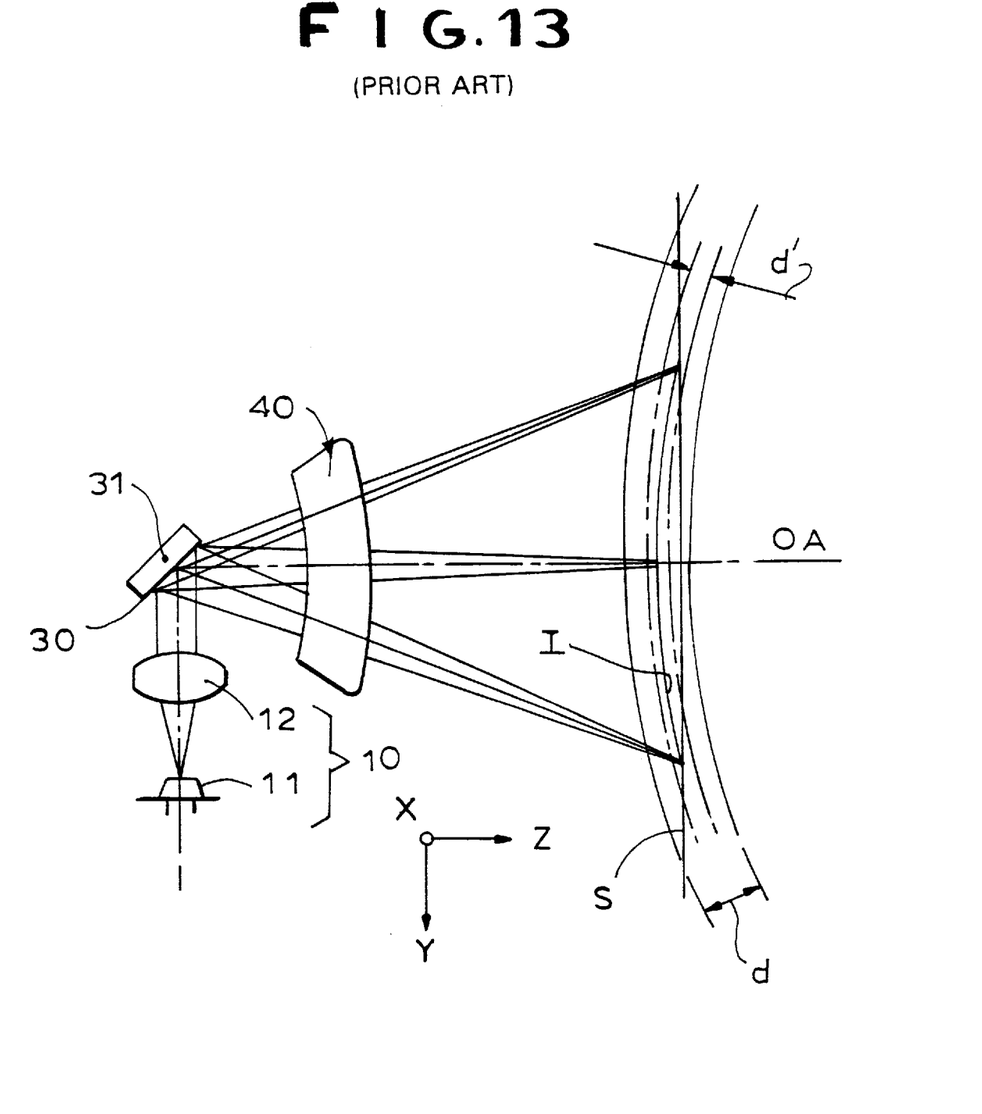
FIG. 13 is a plan view of a conventional optical beam scanning apparatus.

FIG. 13 is a plan view showing a conventional optical beam scanning apparatus. As shown in FIG. 13, this optical beam scanning apparatus comprises a first optical part 10 which is formed by a semiconductor laser 11 and a collimator lens 12. An optical beam emitted from the semiconductor laser 11 is shaped by the collimator lens 12, and then emitted toward a galvanometer 30 which rotates about an axis 31.

Further, a scanning lens 40 is disposed between the galvanometer 30 and a surface-to-be-scanned S so that an optical beam deflected by the galvanometer 30 is focused on the surface-to-be-scanned S.

In this manner, the optical beam scanning apparatus shown in FIG. 13 is a pre-objective type optical beam scanning apparatus in which the galvanometer 30 is disposed on an upstream side to the scanning lens 40, i.e., on the first optical part 10 side. An optical beam from the first optical part 10 is deflected by the galvanometer 30, and a deflected light beam scans the surface-to-be-scanned S through the scanning lens 40 in the main scanning direction Y.

By the way, in a conventional structure, a beam diameter within an optical beam scanning apparatus is relatively large and a depth of focus d is relatively deep as shown in FIG. 13. Therefore, it is possible to position an image surface I within the depth of focus d over the entire scanning range and hence to draw excellently, even if the curvature of the image surface in the main scanning direction Y is somewhat large.

However, in recent years, as the need for highly precise drawing increases, it is increasingly necessary to reduce the beam diameter. To this end, the F-number of the scanning lens 40 must be reduced, and therefore the depth of focus becomes accordingly shallower into the depth of focus d' (<d) as indicated by the two-dot line in FIG. 13, for instance. Now, if the curvature of the image surface is relatively large, the image surface I becomes positioned partially outside the range of the depth of focus d', whereby an image becomes partially out of focus and the image quality is degraded. Hence, for performing excellent drawing, suppression of curvature of image surface is one of the important technical issues.

While the curvature of the image surface is suppressed by designing the scanning lens 40 so that the curvature of the image surface is reduced as much as possible, it is not possible to suppress the curvature of the image surface only by means of optimum designing. This is because curvature of image surface is susceptible to the surface accuracy of a lens, so that a deterioration in the surface accuracy of the lens during processing of the lens remarkably increases the curvature of the image surface and therefore the problem noted above is created. On the other hand, if the surface accuracy of the lens during processing of the lens is increased for the purpose of suppressing curvature of image surface, another problem of an increased cost is created.

Further, instead of by improving the surface accuracy of the lens to suppress curvature of image surface, the image surface I may be adjusted so as to be positioned within the depth of focus over the entire scanning range by moving the imaging position in an optical axis direction Z. However, there is a limit to such adjustment. If the depth of focus is relatively shallow as compared with the curvature of image surface as shown in FIG. 13, it is impossible to position the entire image surface I within the depth of focus even though the imaging position is simply moved.

SUMMARY OF THE INVENTION

The present invention is directed to a method for correcting the curvature of the image surface which is created in an optical beam scanning apparatus in which an optical beam from a light source impinges upon a deflecting system and a deflected optical beam from the deflecting system scans a surface-to-be-scanned through a scanning lens in a main scanning direction, comprising the steps of: (a) scanning the surface-to-be-scanned with the optical beam; (b) judging whether an image surface which is created by the optical beam scanning apparatus is positioned within the depth of focus of the optical beam scanning apparatus over an entire scanning range; and (c) changing the degree of parallel of the optical beam which is incident upon the deflecting system and adjusting the shape of the image surface when the image surface is not positioned within the depth of focus of the optical beam scanning apparatus over the entire scanning range, to thereby position the image surface within the depth of focus of the optical beam scanning apparatus over the entire scanning range.

Accordingly, a first object of the present invention is to provide for a curvature of image surface correction method with which curvature of image surface is reduced without improving the surface accuracy of a lens.

A second object of the present invention is to provide for an optical beam scanning apparatus for use with the curvature of image surface correction method noted above, with which by reducing the curvature of the image surface it is possible to draw at an excellent image quality over an entire scanning range.

Preferably, the method further comprises the step of: (d) moving optical elements starting from the light source to the scanning lens as one unit along an optical axis of the optical beam scanning apparatus after adjusting the shape of the image surface, to thereby approximately coincide an imaging position of the optical beam scanning apparatus with the surface-to-be-scanned.

Preferably, the deflecting system includes a polygon mirror, the optical beam scanning apparatus includes a plurality of inclination compensation lenses for compensating inclination of reflecting surfaces of the polygon mirror, and the method further comprises the step of: (e) moving each one of the plurality of inclination compensation lenses to thereby compensate inclination of the reflecting surfaces of the polygon mirror.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
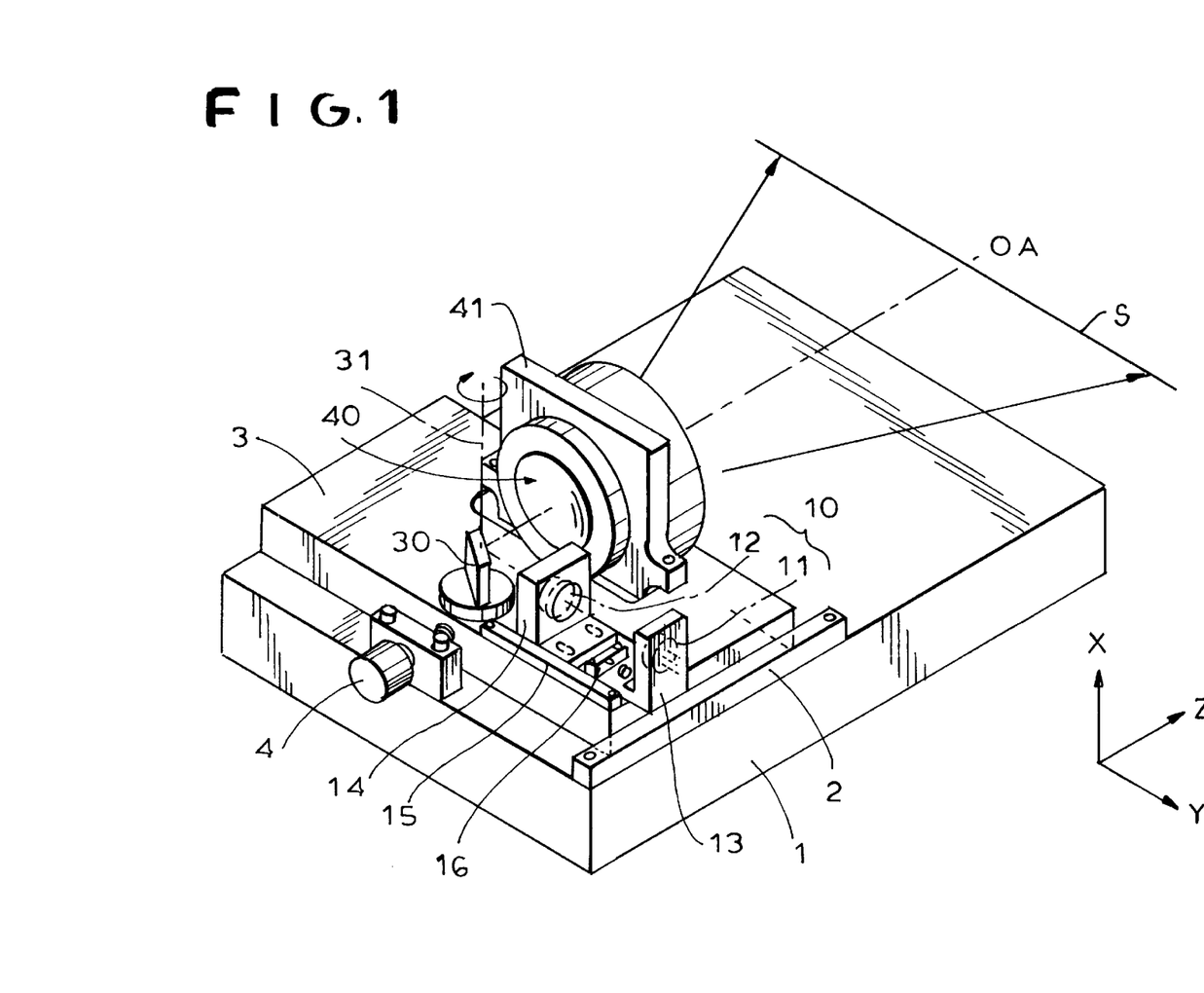
FIG. 1 is a perspective view of an optical beam scanning apparatus according to a first preferred embodiment of the present invention.

FIG. 1 is a perspective view of an optical beam scanning apparatus according to a first preferred embodiment of the present invention. In this optical beam scanning apparatus, a guide 2 is fixedly adhered on an optical base 1, and another optical base 3 is disposed along the guide 2 for free reciprocal movement.

On the optical base 3, a semiconductor laser 11 is held by a laser holder 13, and a collimator lens 12 is held by a lens holder 14. The semiconductor laser 11 is directly modulated and driven based on a signal which is received from a control part (not shown) which controls the entire apparatus, so that on a surface-to-be-scanned S, an optical beam is emitted from the semiconductor laser 11 over a pixel which is to be recorded so as to irradiate and expose the surface-to-be-scanned S, and emission of an optical beam from the semiconductor laser 11 is stopped over a pixel which is not to be recorded. An optical beam which is emitted from the semiconductor laser 11 in this manner is shaped by the collimator lens 12 and discharged toward a galvanometer 30. For example, when the semiconductor laser 11 is positioned at a forward focal point position of the collimator lens 12, the optical beam from the semiconductor laser 11 is shaped by the collimator lens 12 into a parallel optical beam and discharged toward the galvanometer 30. Thus, while a first optical part 10 is formed by the semiconductor laser 11 and the collimator lens 12 in this preferred embodiment, the structure of the first optical part 10 is not limited to this, but may be formed by a light source such as a helium-neon laser and an argon laser which cannot be directly modulated and a modulator which modulates an optical beam from the light source, for instance. Further, an LED (Light Emitting Diode) may be used instead of the semiconductor laser 11.

The laser holder 13 is fixedly adhered to the optical base 3, while the semiconductor laser 11 is fixed to the optical base 3. In contrast, the lens holder 14 is freely movable on the optical base 3 along a guide 15. When an operator manipulates an adjustment screw 16, the lens holder 14 moves, thereby moving and positioning the collimator lens 12 along an optical axis OA. Hence, by moving the collimator lens 12 along the optical axis OA, it is possible to accordingly change the degree of parallelism of an optical beam which is emitted toward the galvanometer 30. Thus, in this preferred embodiment, adjusting means for changing the degree of parallelism of an optical beam which is to be incident upon the galvanometer (i.e., deflecting system) 30 is formed by the lens holder 14, the guide 15, and the adjustment screw 16, and the shape of the image surface is changed when the degree of parallelism of an optical beam which is incident upon the galvanometer 30 is changed by the adjusting means. Regarding a relationship between a change in the degree of parallelism and a change in the shape of the image surface, a description will be given later under the section "Procedures For Changing Curvature Of Image Surface In Optical Beam Scanning Apparatus," while citing an example.

The galvanometer 30 is disposed on the optical base 3, for free rotation about an axis 31, so as to deflect an optical beam from the first optical part 10 and guide the same toward the scanning lens 40 side. However, the deflecting system for deflecting an optical beam is not limited to the galvanometer 30, but may be a resonant scanner (resonance type galvanometer), a penta-prism, a monogon mirror, a polygon mirror, etc. When a polygon mirror is used as the deflecting system, it is essential to compensate inclination of reflecting surfaces of the polygon mirror. As this is a little different from this preferred embodiment, this will be described in detail later as another preferred embodiment.

The scanning lens 40 is fixedly adhered to the optical base 3 while held by a lens holder 41, so as to guide an optical beam from the galvanometer 30 toward the surface-to-be-scanned S.

To the optical base 3 seating the semiconductor laser 11, the collimator lens 12, the adjusting means, the galvanometer 30, and the scanning lens 40, an adjustment knob 4 is linked. Therefore, the optical base 3 is moved along the guide 2 when an operator manipulates the adjustment knob 4, so that the optical elements starting from the first optical part 10 to the scanning lens 40 (i.e., the semiconductor laser 11, the collimator lens 12, the adjusting means, the galvanometer 30, and the scanning lens 40) are moved and positioned as one unit. When the optical elements which are mounted on the optical base 3 are moved as one unit in this manner, the imaging position of an image surface which is formed by the optical beam scanning apparatus is moved in the optical axis direction Z. In this preferred embodiment, imaging position changing means functioning as such is formed by the guide 2 and the adjustment knob 4.

Figure 2:
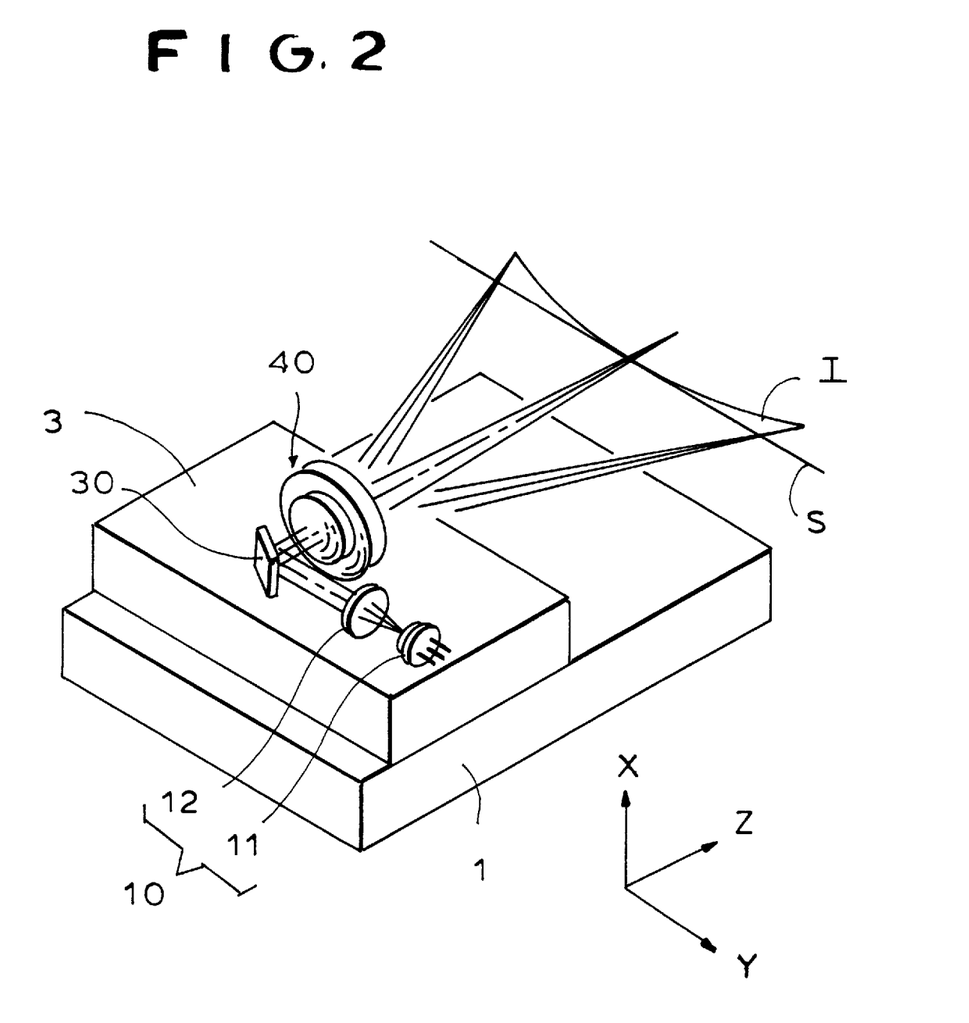
FIGS. 2 to 4 are perspective views for describing procedures for correcting curvature of image surface in the optical beam scanning apparatus of FIG. 1.

Next, procedures for correcting curvature of image surface in the optical beam scanning apparatus having such a structure will be described with reference to FIGS. 2 to 4.

Except for a case where lenses are processed at an especially high surface accuracy, when the optical beam scanning apparatus is assembled using lenses which are manufactured through normal lens processing, curvature of the image surface may be created as described above. For convenience of description, it is assumed here that the image surface I is carved toward an over side as shown in FIG. 2.

Figure 3:
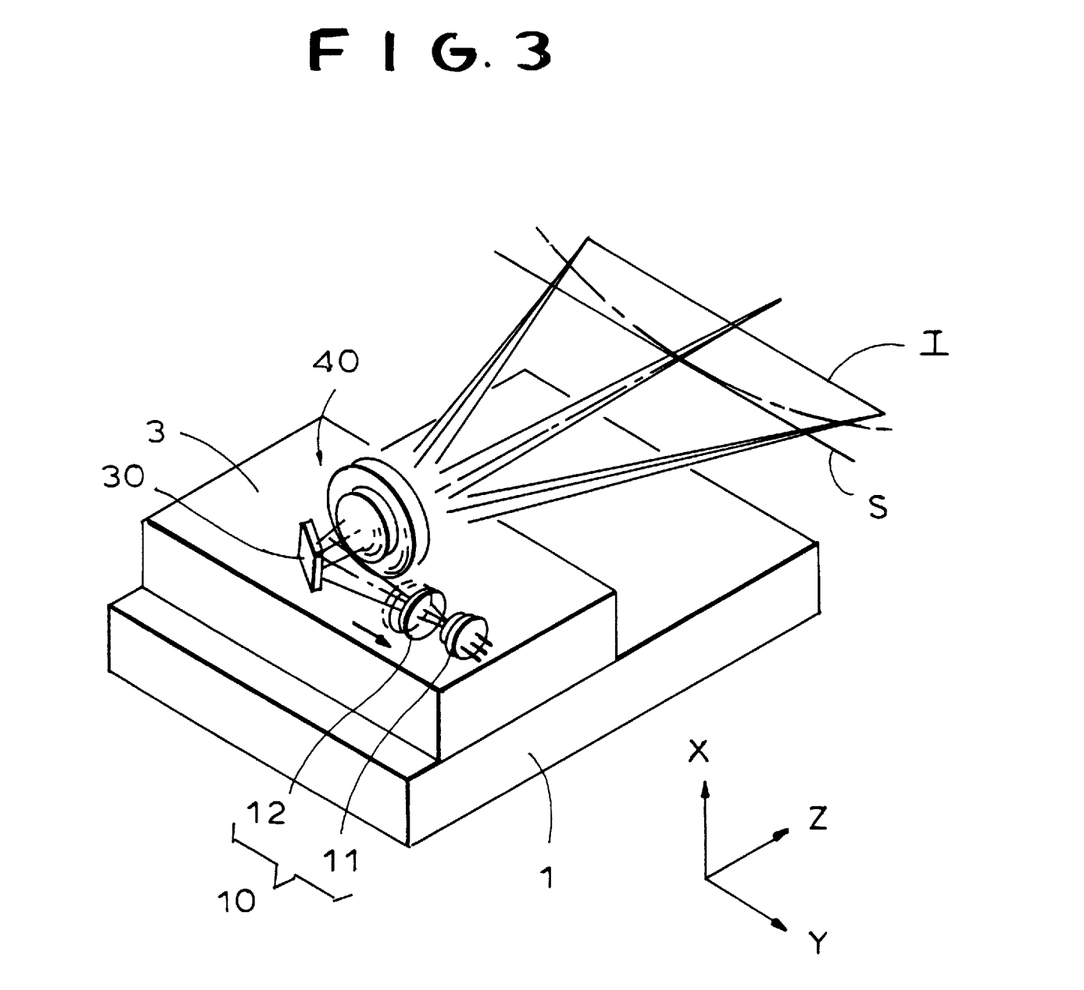
Figure 4:
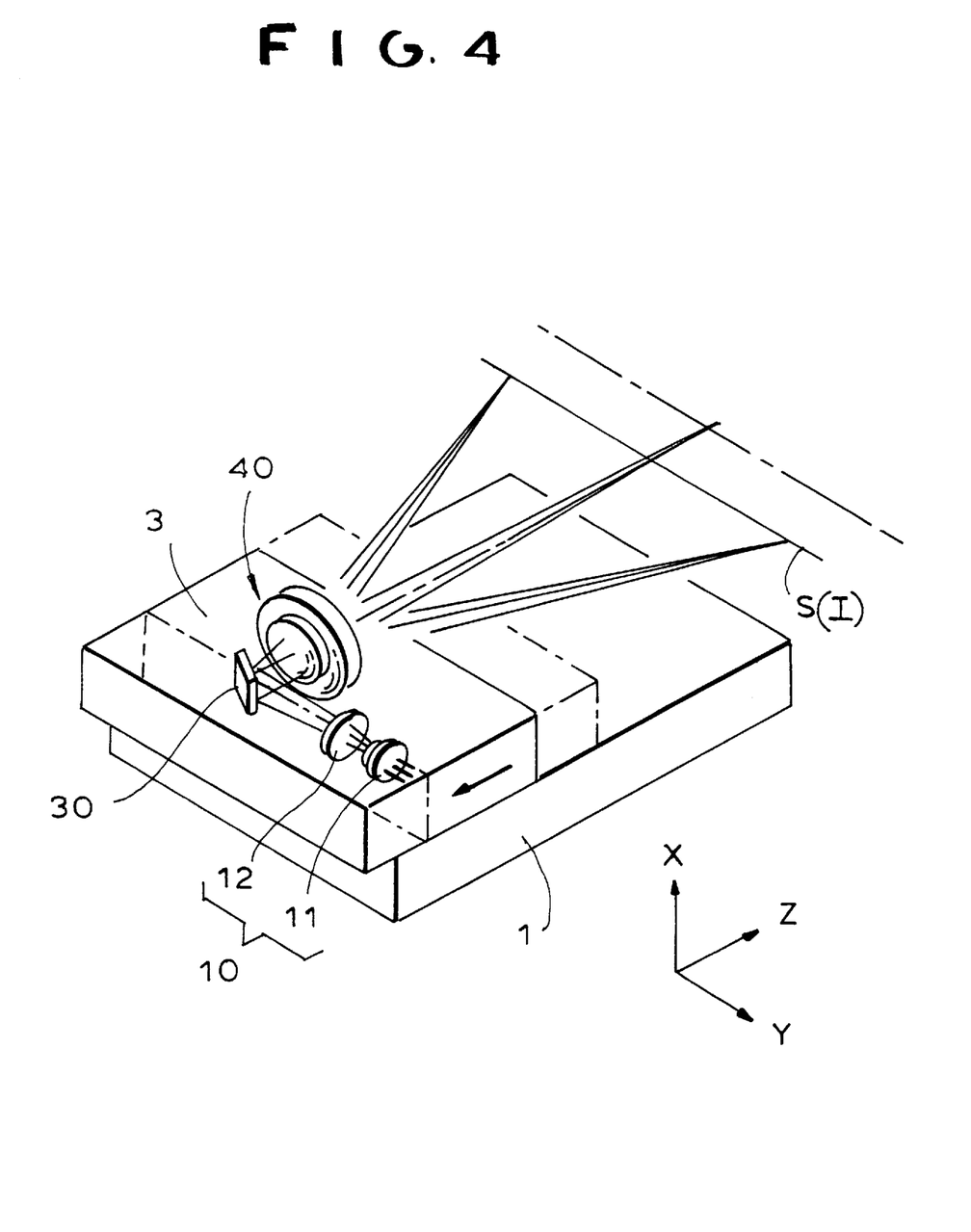

In such a case, when the lens holder 14 is moved as indicated by the white arrow in FIG. 3 so that the collimator lens 12 is moved close to the semiconductor laser 11, the degree of parallelism of an optical beam which is incident upon the galvanometer 30 is changed, and therefore, the shape of the image surface I is accordingly changed. Considering this, when the shape of the image surface becomes flat or at least when the image surface I roughly comes within the depth of focus, the collimator lens 12 is stopped moving and the lens holder 14 is fixed to the optical base 3 by means of a bolt (not shown).

As the degree of parallelism of an optical beam is changed, not only the shape of the image surface but the position the image surface I as well are moved in the optical axis direction Z. If the quantity of the movement is small and the image surface I is within the depth of focus at least over the entire scanning range, there is no particular problem with the image quality and therefore correction of curvature of image surface may be ended at this stage. Of course, it is desirable to perform this processing to approximately coincide the image surface I with the surface-to-be-scanned S even in such a case.

As the imaging position is moved due to a change in the degree of parallelism, the imaging position (i.e., the position of the image surface I) is sometimes largely displaced from the surface-to-be-scanned S in the optical axis direction Z as shown in FIG. 3, for instance. In this case, as shown in FIG. 4, the adjustment knob 4 is operated to move the optical base 3 in the direction of the white arrow and move the optical elements mounted on the optical base 3 (i.e., the semiconductor laser 11, the collimator lens 12, the galvanometer 30, and the scanning lens 40) as one unit in a direction (−Z), so that the image surface I is coincident with the surface-to-be-scanned S. Since this positions the entire image surface within the depth of focus over the entire scanning range without fail, drawing is performed with an excellent image quality.

As described above, since the shape of the image surface I is adjusted by changing the degree of parallelism of an optical beam which is incident upon the galvanometer 30 so that the image surface I is positioned within the depth of focus of the optical beam scanning apparatus over the entire scanning range in this preferred embodiment, it is possible to reduce the curvature of the image surface without improving the surface accuracy of the scanning lens 40. That is, the optical beam scanning apparatus according to this preferred embodiment can reduce curvature of image surface and perform drawing with an excellent image quality over the entire scanning range while preventing an increase in a cost of the apparatus.

Figure 5:
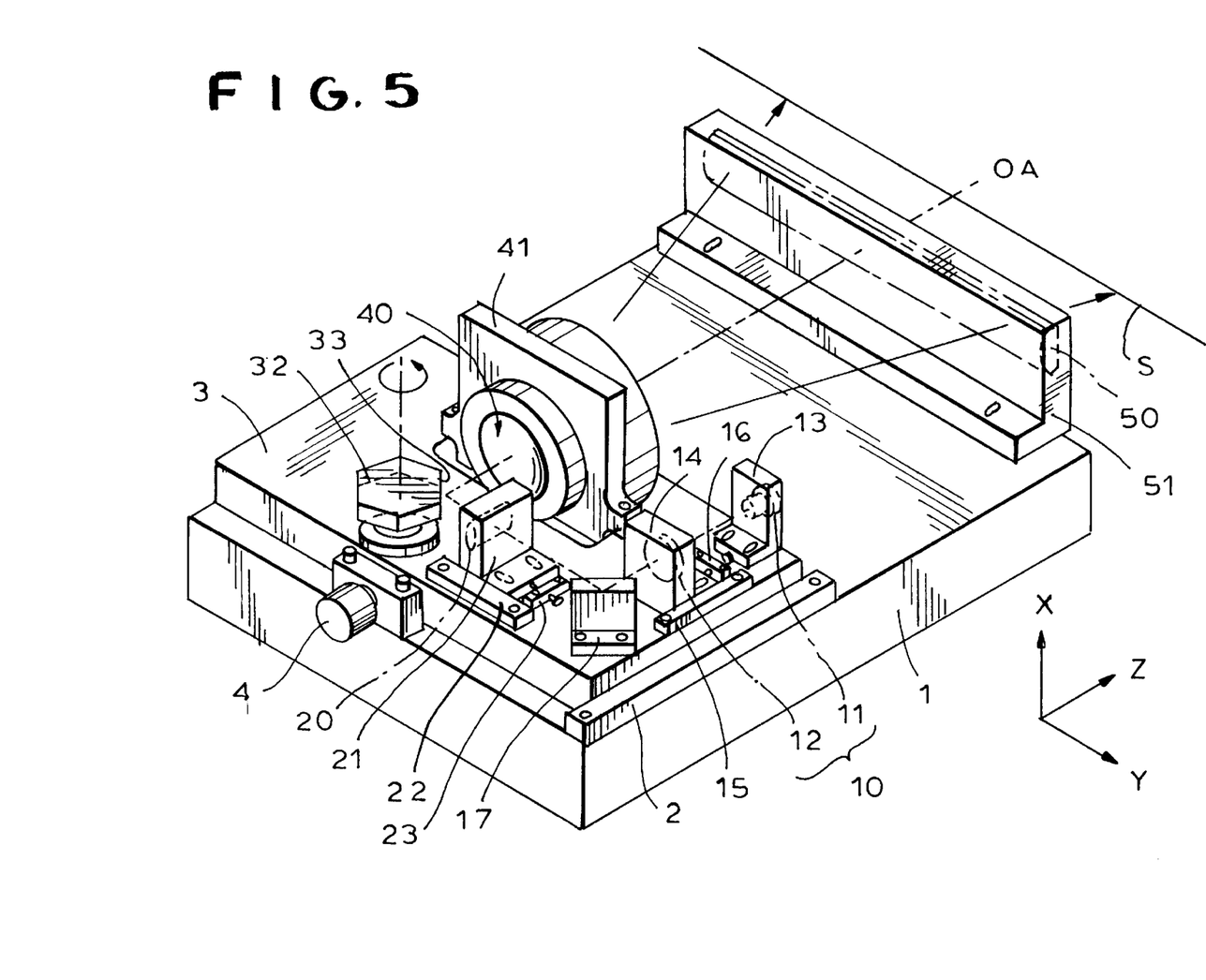
FIG. 5 is a perspective view of an optical beam scanning apparatus according to a second preferred embodiment of the present invention.

FIG. 5 is a perspective view of an optical beam scanning apparatus according to a second preferred embodiment of the present invention. This optical beam scanning apparatus is largely different from that of the first preferred embodiment described above with respect to the following three points.

A first difference is use of a polygon mirror 32 as the deflecting system.

A second difference is disposition of cylindrical lenses 20, 50 each having a power only in a sub scanning direction X for the purpose of compensating inclination of reflecting surfaces of the polygon mirror which is associated with use of the polygon mirror 32. The cylindrical lens 20 is disposed between a mirror 17, which guides an optical beam from the collimator lens 12 toward the polygon mirror 32 side, and the polygon mirror 32. The cylindrical lens 50 is disposed between the scanning lens 40 and the surface-to-be-scanned S.

Further, as a third difference, the cylindrical lenses 20 and 50 are held by lens holder 21 and 51, respectively, and are freely movable along the optical axis OA on optical bases 3 and 1, respectively. With respect to the cylindrical lens 20 in particular, the lens holder 21 is movable along a guide 22 which is fixedly adhered to the optical base 3, so that by moving the lens holder 21 by means of an adjustment screw 23, the cylindrical lens 20 is positioned.

Since the other structure is similar to that of the first preferred embodiment, identical reference symbols are assigned to the other structure and a redundant description will be omitted.

Now, procedures for correcting curvature of image surface in the optical beam scanning apparatus having such a structure will be described with reference to FIGS. 6 to 8.

Except for a case where lenses are processed at an especially high surface accuracy, when the optical beam scanning apparatus is assembled using lenses which are manufactured through normal lens processing, curvature of image surface may be created as in the first preferred embodiment. In this preferred embodiment as well, for convenience of description, it is assumed here that the image surface is carved toward an over side.

Figure 6:
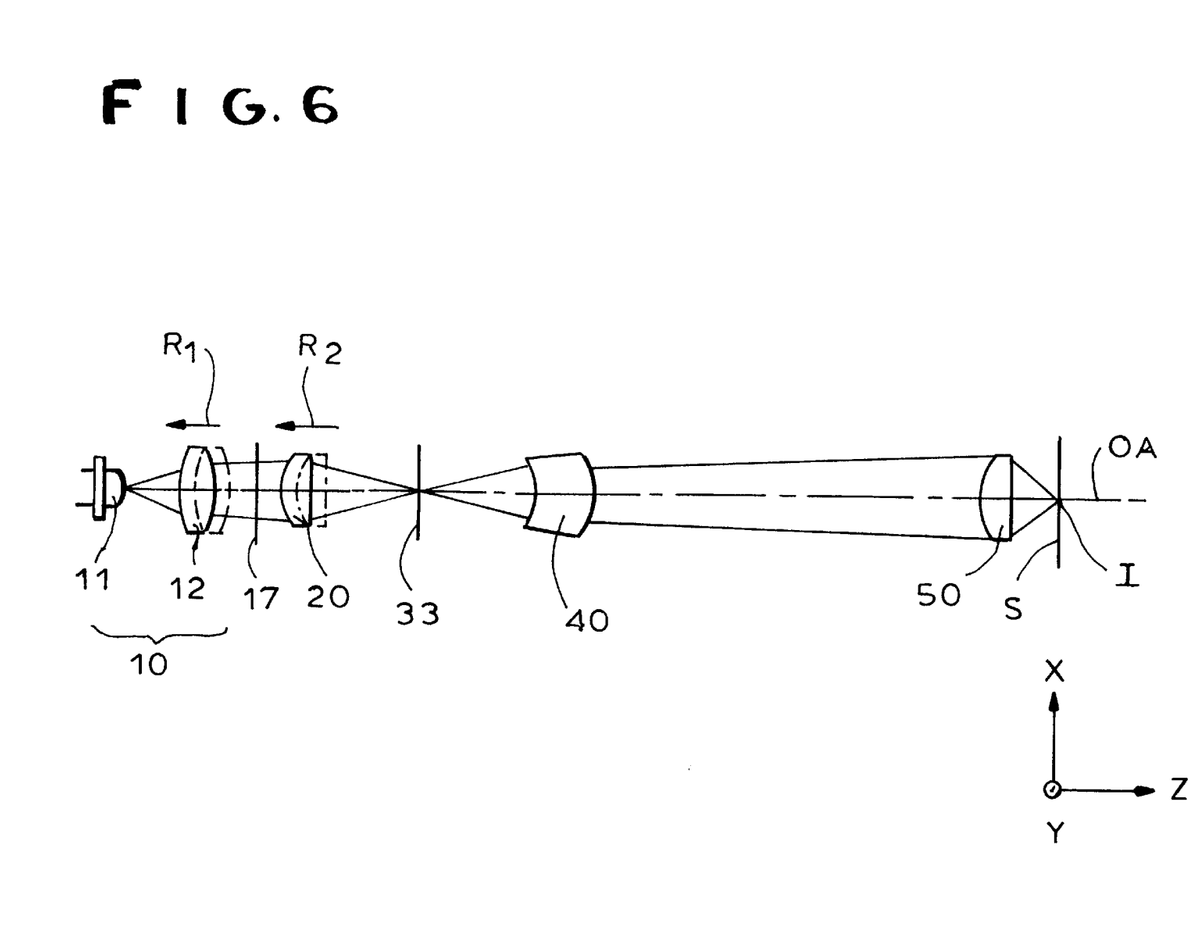
FIGS. 6 to 8 are perspective views for describing procedures for correcting curvature of image surface in the optical beam scanning apparatus of FIG. 5.
Figure 7:
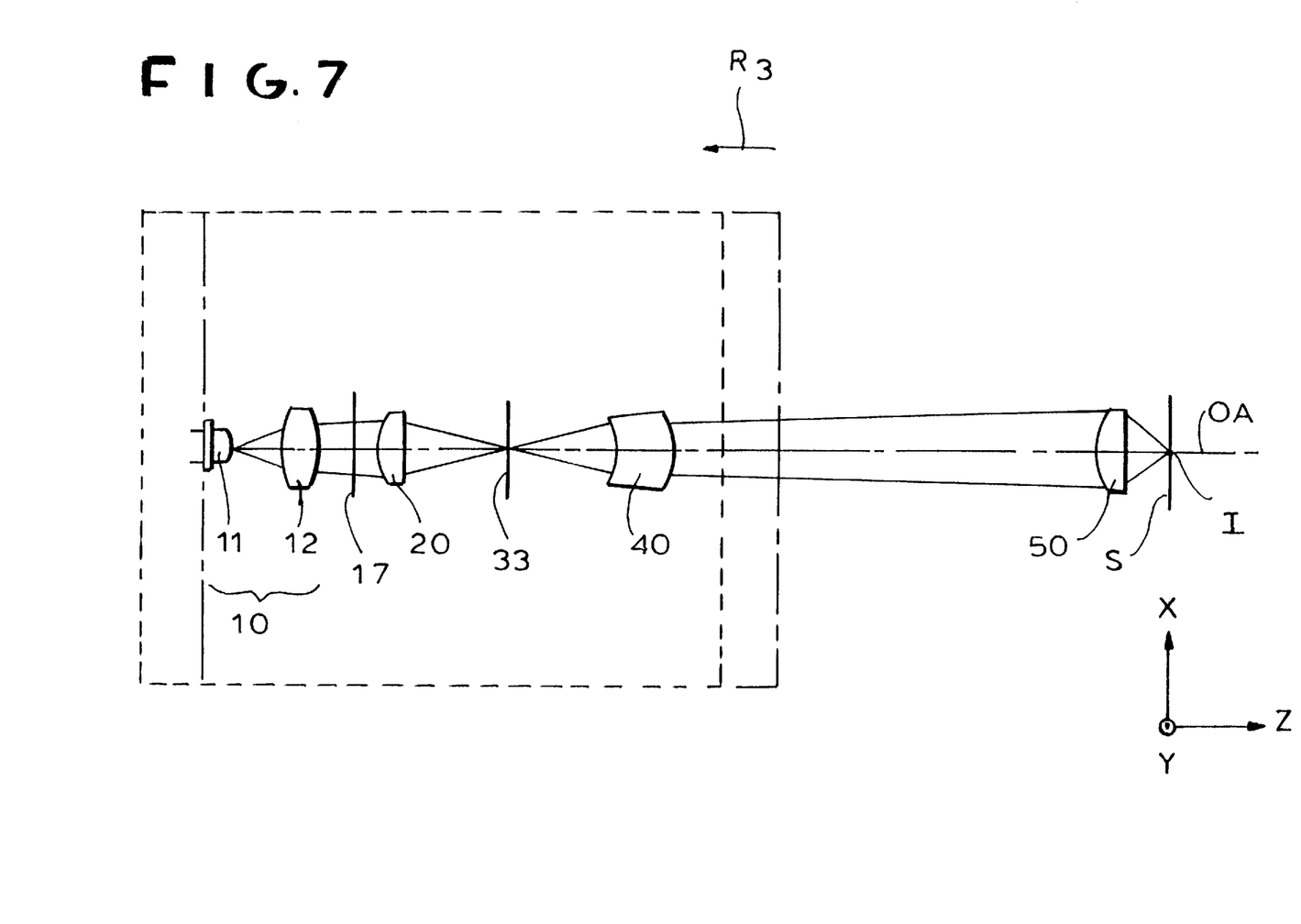

In such a case, when the lens holder 14 (See FIG. 5) is moved as indicated by the arrow $R_1$ in FIG. 6 so that the collimator lens 12 is moved close to the semiconductor laser 11, the degree of parallel of an optical beam which is incident upon the polygon mirror 32 is changed, and therefore, the shape of the image surface is accordingly changed. Considering this, when the shape of the image surface becomes flat or at least when the image surface roughly comes within the depth of focus, the collimator lens 12 is stopped moving and the lens holder 14 is fixed to the optical base 3 (See FIG. 5) by means of a bolt (not shown).

Further, when the collimator lens 12 is moved in the manner described above, the semiconductor laser 11 and a mirror surface 33 of the polygon mirror 32 fail to become optically conjugate with each other in the sub scanning direction X, which makes it impossible to correct inclination of reflecting surfaces of the polygon mirror 32. To deal with this, the cylindrical lens (i.e., first inclination compensation lens) 20 is moved toward the collimator lens 12 side as indicated by the arrow $R_2$ in FIG. 6, so that the semiconductor laser 11 and the mirror surface 33 of the polygon mirror 32 are adjusted so as to be optically conjugate with each other in the sub scanning direction X. In this preferred embodiment, since an operator moves the lens holder 21 along the guide 22 by means of the adjustment screw 23, the lens holder 21, the guide 22 and the adjustment screw 23 serve as first moving means for inclination compensation which make the semiconductor laser 11 and the mirror surface 33 of the polygon mirror 32 optically conjugate with each other in the sub scanning direction X.

While the cylindrical lens (i.e., first inclination compensation lens) 20 is moved after the shape of the image surface is adjusted by moving the collimator lens 12 in this preferred embodiment, such adjustment may be achieved by performing these operations in a reverse order or by moving the lenses 12 and 20 alternately.

Further, as the degree of parallel of an optical beam is changed, not only the shape of the image surface but the position the image surface as well are moved in the optical axis direction Z. If the quantity of the movement is small and the image surface is within the depth of focus at least over the entire scanning range, there is no particular problem with the image quality and therefore correction of curvature of image surface may be ended at this stage. Of course, it is desirable to perform next processing to approximately coincide the image surface with the surface-to-be-scanned S even in such a case.

As the imaging position is moved due to a change in the degree of parallel, the imaging position (i.e., the position of the image surface I) is sometimes displaced from the surface-to-be-scanned S in the optical axis direction Z, in such a case, the adjustment knob 4 is operated to move the optical base 3 in the direction of the arrow $R_3$ and move the optical elements which are mounted on the optical base 3 (i.e., the elements enclosed in the dotted line in FIG. 7: the semiconductor laser 11, the collimator lens 12, the mirror 17, the cylindrical lens 20, the polygon mirror 32 and the scanning lens 40) as one unit, so that the image surface I is coincided with the surface-to-be-scanned S. Since this position the entire image surface within the depth of focus over the entire scanning range without fail, drawing is performed with an excellent image quality.

Further, although the mirror surface 33 of the polygon mirror 32 and the surface-to-be-scanned S are not optically conjugate with each other any more in the sub scanning direction X as the scanning lens 40 is moved, in many cases, since the quantity of displacement from the conjugate relationship is relatively small (this is because displacement is approximately within the range of the depth of focus), there is almost no influence due to inclination of reflecting surfaces of the polygon mirror 32.

Figure 8:
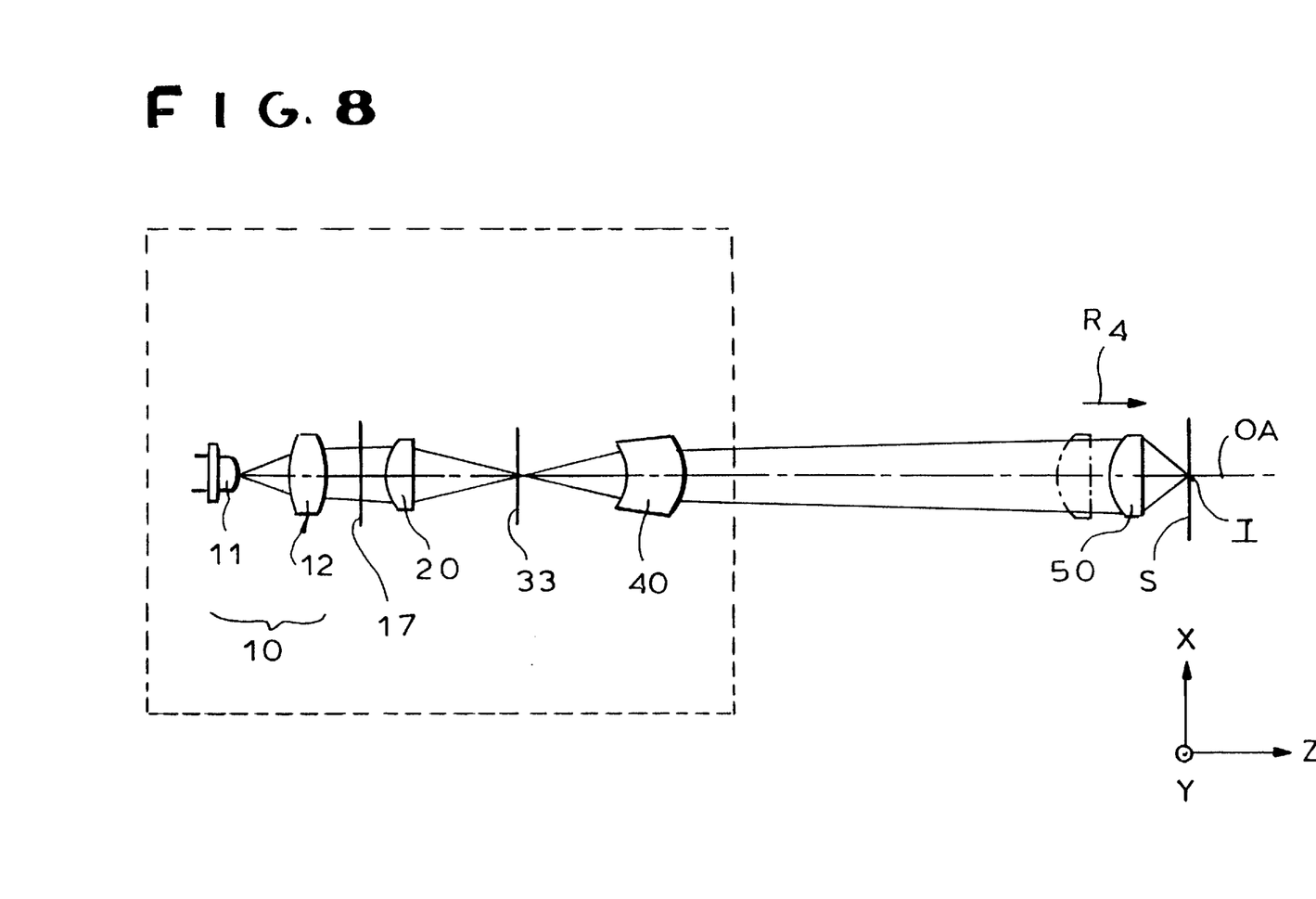

However, if the influence is relatively large, it is necessary to eliminate the adverse affect of the inclination of reflecting surfaces of the polygon mirror by moving the cylindrical lens 50 is moved toward the surface-to-be-scanned S side as indicated by the arrow $R_4$ in FIG. 8 and accordingly adjusting the mirror surface 33 of the polygon mirror 32 and the surface-to-be-scanned S so as to be completely optically conjugate with each other in the sub scanning direction X. In this preferred embodiment, two long holes 52 are formed in a lower portion of the lens holder 51. After moving and positioning the cylindrical lens 50 within the range between the long holes 52, the lens holder 51 is fixed to the optical base 1 by means of a bolt (not shown). This structure corresponds to second moving means for inclination compensation of inclination of reflecting surfaces of the polygon mirror.

As described above, according to this preferred embodiment, since the shape of the image surface is adjusted by changing the degree of parallel of an optical beam which is incident upon the polygon mirror 32 so that the image surface is positioned within the depth of focus of the optical beam scanning apparatus over the entire scanning range, it is possible to reduce curvature of image surface without improving the surface accuracy of the scanning lens 40. That is, the optical beam scanning apparatus according to this preferred embodiment can reduce curvature of image surface and perform drawing with an excellent image quality over the entire scanning range while preventing an increase in a cost of the appratus.

Further, since the cylindrical lenses 20, 50 for compensation of inclination of reflecting surfaces of the polygon mirror are freely movable in the optical axis direction Z, and inclination of reflecting surfaces of the polygon mirror is compensated moving the cylindrical lens 20 in accordance with movement of the collimator lens 12 and/or the cylindrical lens 50 in accordance with movement of the optical base 3, it is possible to perform excellent drawing while suppressing an influence of inclination of reflecting surfaces of the polygon mirror.

The imaging position changing means for moving the optical base 3, the adjusting means for moving the collimator lens 12, the first moving means for compensating inclination of reflecting surfaces of the polygon mirror which moves the cylindrical lens 20, and the second moving means for compensating inclination of reflecting surfaces of the polygon mirror which moves the cylindrical lens 50 are not limited to the structures described above. Rather, a motor driving mechanism may be mounted instead of the adjustment knob 4 to automatically adjust in response to a signal from the control part.

Figure 9:
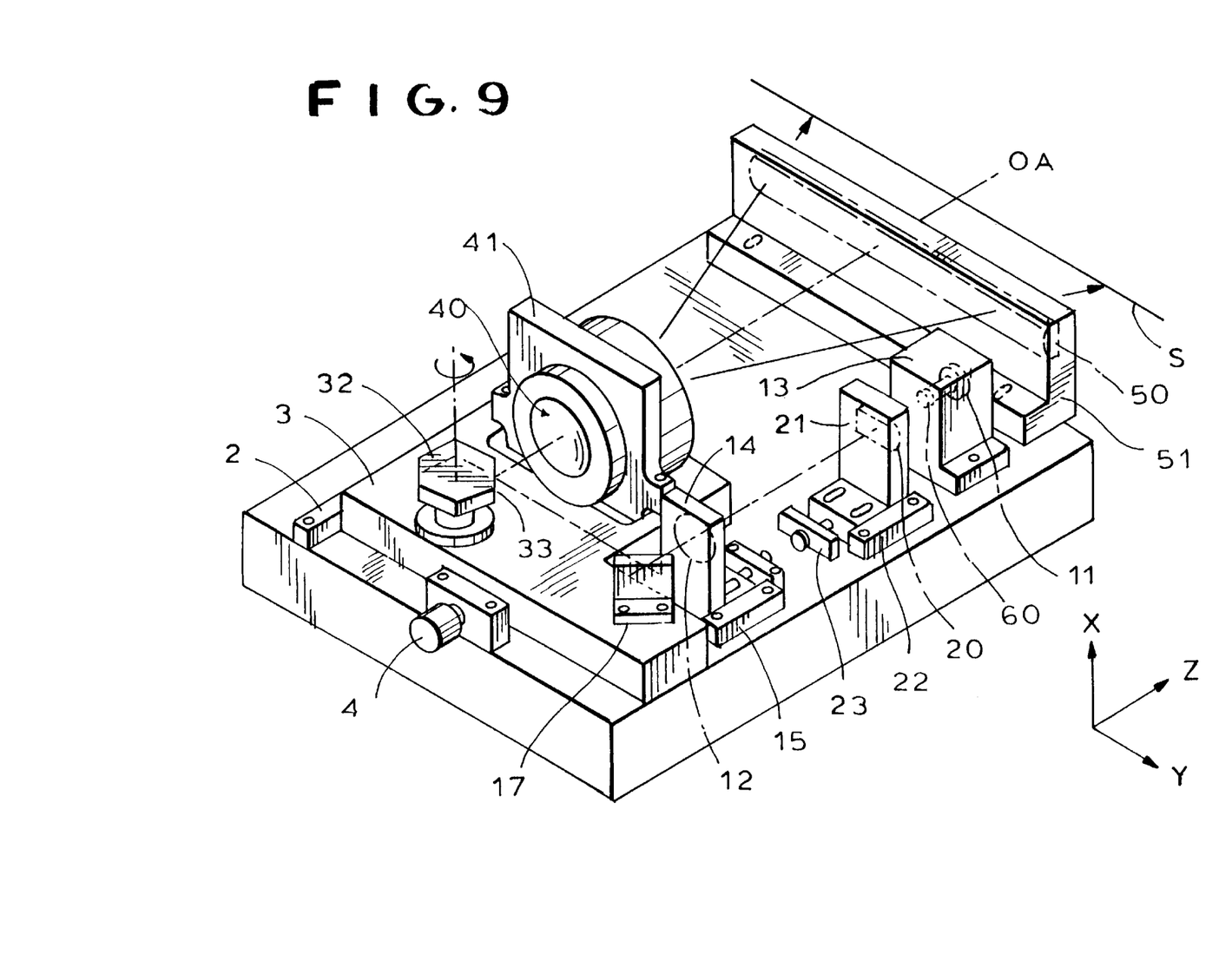
FIG. 9 is a perspective view of an optical beam scanning apparatus according to a third preferred embodiment of the present invention.
Figure 10A:
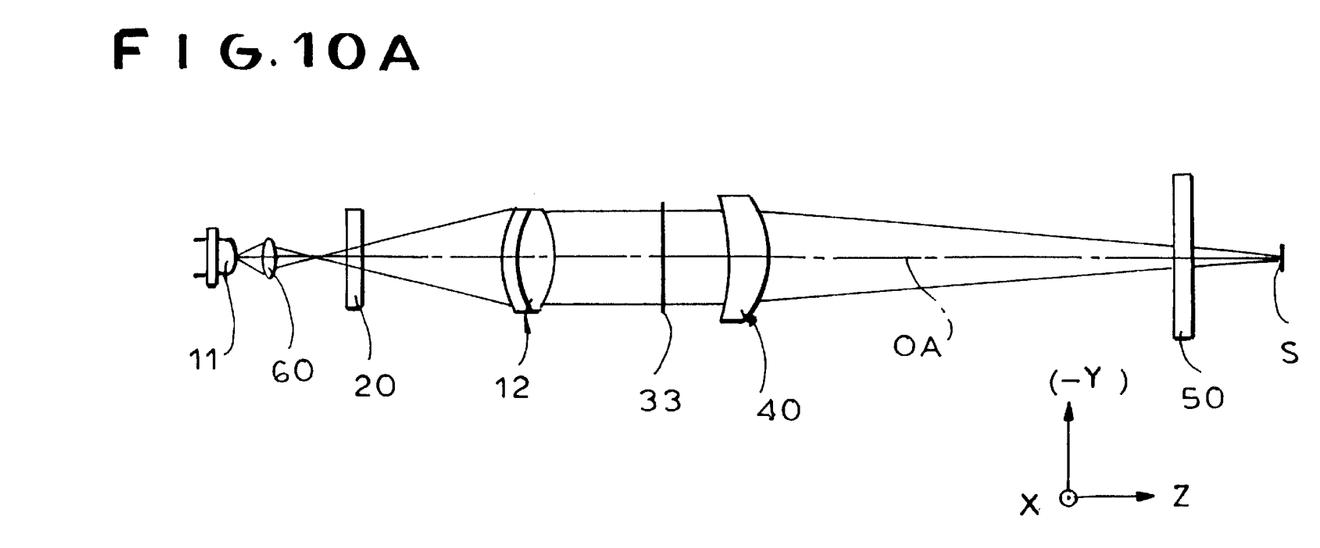
FIGS. 10A and 10B are plan views of the optical beam scanning apparatus of FIG. 9.
Figure 10B:
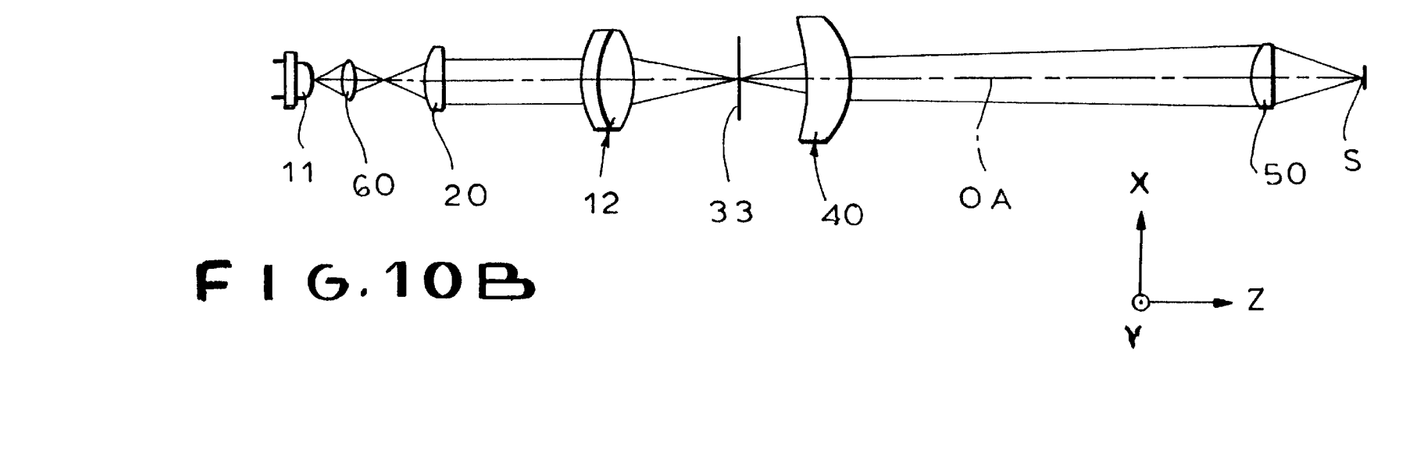

FIG. 9 is a perspective view of an optical beam scanning apparatus according to a third preferred embodiment of the present invention. FIGS. 10A and 10B are plan views of the optical beam scanning apparatus of FIG. 9. FIG. 10A is a plan view taken at a main scanning surface (i.e., YZ plane), while FIG. 10B is a plan view taken at a sub scanning surface (i.e., XZ plane). Although using the polygon mirror 32 as the deflecting system, this optical beam scanning apparatus is different from that of the third preferred embodiment with respect to the following points.

As a first difference, the semiconductor laser 11 and a relay lens 60 are held by the lens holder 13, so that an intermediate image of the semiconductor laser 11 is formed at an emission side of the relay lens 60.

As a second difference, a positional relationship between the cylindrical lens 20 and the collimator lens 12 is reverse. That is, in the optical beam scanning apparatus according to this preferred embodiment, as shown in FIGS. 9, 10A and 10B, an optical beam from the semiconductor laser 11 is incident upon the cylindrical lens 20, which has a power only in the sub scanning direction X, through the relay lens 60, shaped by the collimator lens 12, and thereafter guided into the polygon mirror 32 through the mirror 17.

As a third difference, while the optical beam scanning apparatus shown in FIG. 5 requires all optical elements from the semiconductor laser 11 to the scanning lens 40 to be mounted on the optical base 3 so that these optical elements are freely movable in the optical axis direction Z as one unit, in the optical beam scanning apparatus according to this preferred embodiment, only the mirror 17, the polygon mirror 32 and the scanning lens 40 are fixed on the optical base 3 so that only the mirror 17, the polygon mirror 32 and the scanning lens 40 are freely moved in the optical axis direction Z as the adjustment knob 4 is manipulated.

Since the other structure is similar to that of the first preferred embodiment, identical reference symbols are assigned to the other structure and a redundant description will be omitted.

Now, procedures for correcting curvature of image surface in the optical beam scanning apparatus having such a structure will be described with reference to FIGS. 11 and 12.

Except for a case where lenses are processed at an especially high surface accuracy, when the optical beam scanning apparatus is assembled using lenses which are manufactured through normal lens processing, curvature of image surface may be created as in the preferred embodiments describe earlier. In this preferred embodiment as well, for convenience of description, it is assumed here that the image surface is carved toward an over side.

Figure 11:
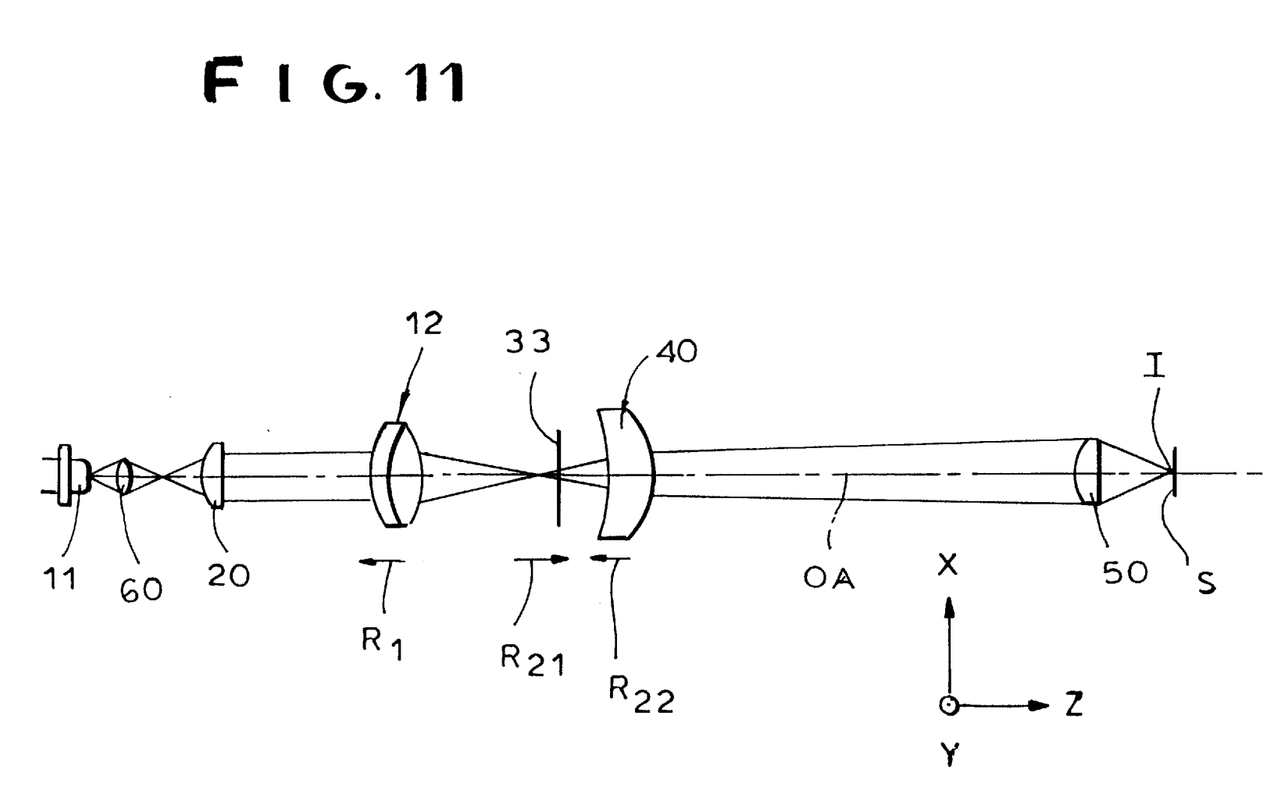
FIGS. 11 and 12 are perspective views for describing procedures for correcting curvature of image surface in the optical beam scanning apparatus of FIG. 9.

In such a case, when the lens holder 14 (See FIG. 9) is moved as indicated by the arrow $R_1$ in FIG. 11 so that the collimator lens 12 is moved close to the semiconductor laser 11, the degree of parallel of an optical beam which is incident upon the polygon mirror 32 is changed, and therefore, the shape of the image surface is accordingly changed. Considering this, when the shape of the image surface becomes flat or at least when the image surface roughly comes within the depth of focus, the collimator lens 12 is stopped moving and the lens holder 14 is fixed to the optical base 1 (See FIG. 9) by means of a bolt (not shown).

Further, as the degree of parallel of an optical beam is changed, not only the shape of the image surface but the position the image surface as well are moved in the optical axis direction Z. If the quantity of the movement is small and the image surface is within the depth of focus at least over the entire scanning range, there is no particular problem with the image quality and therefore correction of curvature of image surface may be ended at this stage. Of course, it is desirable to perform next processing to approximately coincide the image surface with the surface-to-be-scanned S even in such a case.

As the imaging position is moved due to a change in the degree of parallel, the imaging position (i.e., the position of the image surface I) is sometimes displaced from the surface-to-be-scanned S in the optical axis direction Z, in such a case, the adjustment knob 4 is operated to move the mirror 17, the polygon mirror 32 and the scanning lens 40 as one unit together with the optical base 3, thereby moving the scanning lens 40 away from the surface-to-be-scanned S as indicated by the arrow $R_{22}$ in FIG. 11. Accordingly, the mirror surface 33 of the polygon mirror 32 is moved away from the collimator lens 12 as indicated by the arrow $R_{21}$ in FIG. 11. While FIG. 11 shows the mirror surface 33 of the polygon mirror 32 and the scanning lens 40 as they come close to each other as the optical base 3 is moved in this manner, this is to clearly illustrate a manner in which the mirror surface 33 and the scanning lens 40 are moved away from the collimator lens 12 and the surface-to-be-scanned S, respectively. A distance between the both optical elements (i.e., the polygon mirror 32 and the scanning lens 40) which are fixed to the optical base 3 is always constant, as can be understood from FIG. 9.

When the polygon mirror 32 and the scanning lens 40 are moved in this manner so that the optical length between the scanning lens 40 and the surface-to-be-scanned S is extended, and consequently, as the entire image surface is positioned within the depth of focus over the entire scanning range without fail, drawing is performed with an excellent image quality.

Further, although the mirror surface 33 of the polygon mirror 32 and the surface-to-be-scanned S are not optically conjugate with each other any more in the sub scanning direction X as the polygon mirror 32 and the scanning lens 40 are moved, in many cases, since the quantity of displacement from the conjugate relationship is relatively small (this is because displacement is approximately within the range of the depth of focus), there is almost no influence due to inclination of reflecting surfaces of the polygon mirror 32.

Figure 12:
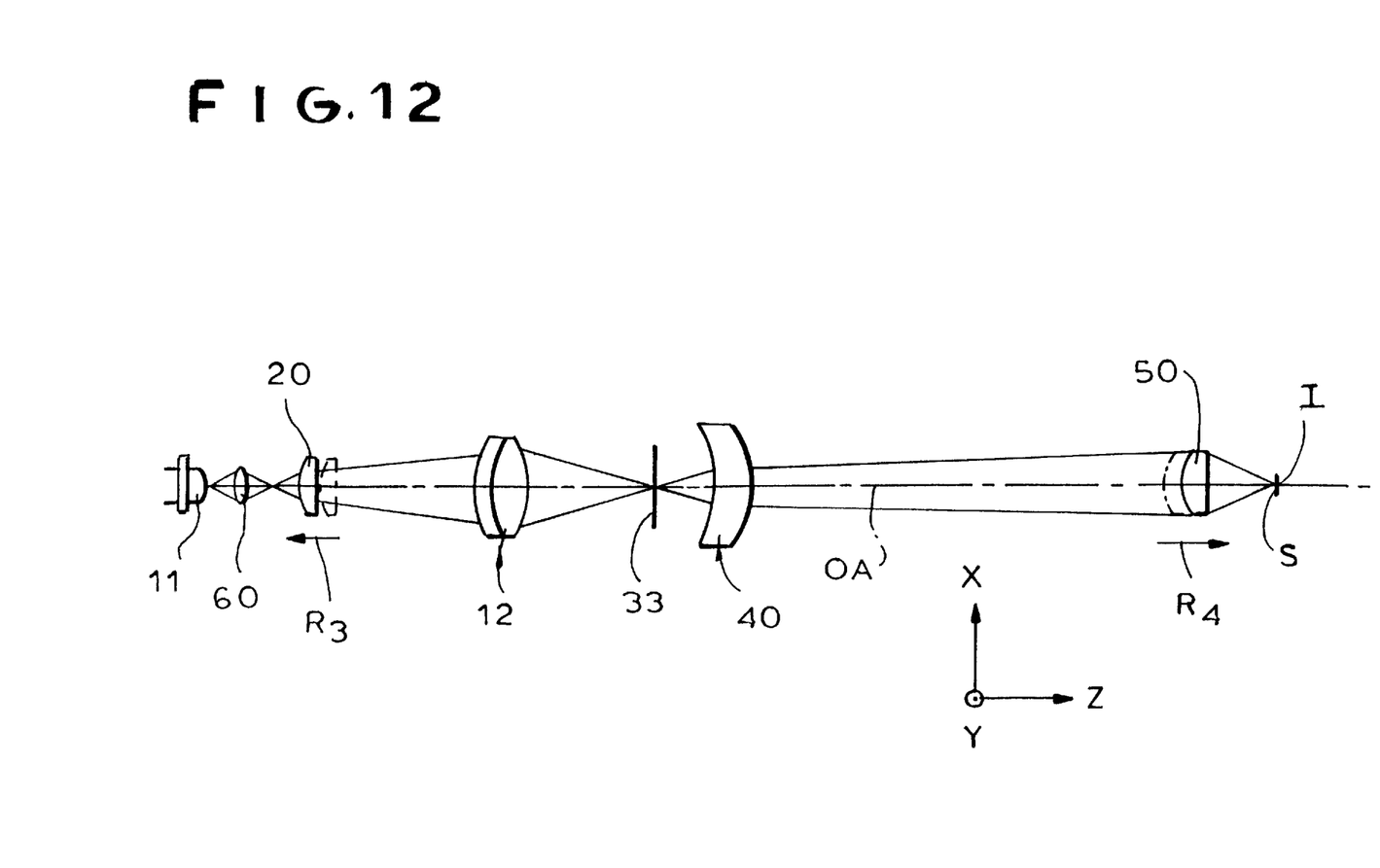

However, if the influence is relatively large, it is necessary to eliminate the adverse affect of the inclination of reflecting surfaces of the polygon mirror by moving the cylindrical lens 20 is moved toward the semiconductor laser 11 side as indicated by the arrow $R_3$ in FIG. 12 while moving the cylindrical lens 50 toward the surface-to-be-scanned S side as indicated by the arrow $R_4$ in FIG. 12 and accordingly adjusting the mirror surface 33 of the polygon mirror 32 and the surface-to-be-scanned S so as to be completely optically conjugate with each other in the sub scanning direction X.

As described above, according to this preferred embodiment, since the shape of the image surface is adjusted by changing the degree of parallel of an optical beam which is incident upon the polygon mirror 32 so that the image surface is positioned within the depth of focus of the optical beam scanning apparatus over the entire scanning range, it is possible to reduce curvature of image surface without improving the surface accuracy of the scanning lens 40. That is, the optical beam scanning apparatus according to this preferred embodiment can reduce curvature of image surface and perform drawing with an excellent image quality over the entire scanning range while preventing an increase in a cost of the appratus.

Further, since the cylindrical lenses 20, 50 for compensating inclination of reflecting surfaces of the polygon mirror are freely movable in the optical axis direction Z and inclination of reflecting surfaces of the polygon mirror is compensated by moving the cylindrical lenses 20, 50 if necessary, it is possible to perform excellent drawing while compensating inclination of reflecting surfaces of the polygon mirror.

While the first and the second preferred embodiments require that the adjusting means moves the collimator lens 12 so that the degree of parallel of an optical beam which is incident upon the deflecting system is changed and the shape of the image surface is adjusted, it is possible to change the degree of parallel and adjust the shape of the image surface when the semiconductor laser 11 and the collimator lens 12 are constructed movable relative to each other. In other words, the collimator lens 12 may be fixed while only the semiconductor laser 11 may be moved, or both the semiconductor laser 11 and the collimator lens 12 may be moved.

Further, a cylindrical lens having a power in the main scanning direction Y may be disposed between the first optical part 10 and the deflecting system, and the adjusting means may be structured so as to move this cylindrical lens along the optical axis OA. Such adjusting means as well can change the degree of parallel of an optical beam which impinges upon the deflecting system and adjust the shape of the image surface, like the adjusting means described above.

While the invention has been described in detail, the foregoing description is in all aspects illustrative and not restrictive. It is understood that numerous other modifications and variations can be devised without departing from the scope of the invention.

I claim:

1. A method for correcting curvature of an image surface of an optical beam scanning apparatus in which an optical beam from a light source impinges upon a deflecting system and a deflected optical beam from said deflecting system scans a scanning surface through a scanning lens in a main scanning direction, the method comprising the steps of:

(a) scanning said scanning surface with said optical beam;

(b) determining whether an image surface of said optical beam scanning apparatus is positioned within the depth of focus of said optical beam scanning apparatus over an entire scanning range;

(c) changing the degree of parallelism of said optical beam which is incident upon said deflecting system and adjusting the shape of said image surface when said image surface is not positioned within the depth of focus of said optical beam scanning apparatus over said entire scanning range, to position said image surface within the depth of focus of said optical beam scanning apparatus over said entire scanning range; and (d) moving optical elements, from said light source to said scanning lens, as one unit along an optical axis of said optical beam scanning apparatus after adjusting the shape of said image surface, to have an imaging position of said optical beam scanning apparatus approximately coincident with said scanning surface.

2. The method of claim 1, wherein said deflecting system includes a polygon mirror, said optical beam scanning apparatus includes a plurality of inclination compensation lenses for compensating inclination of reflecting surfaces of said polygon mirror, said method further comprising the step of:

(e) moving each one of said plurality of inclination compensation lenses to thereby compensate inclination of said reflecting surfaces of said polygon mirror.

3. An optical beam scanning apparatus for scanning a scanning surface in a main scanning direction, comprising:

(a) an optical system, including a light source, which generates an optical beam;

(b) a deflecting system deflecting said optical beam;

(c) a scanning lens converging said optical beam on said scanning surface;

(d) an adjustor adjusting the degree of parallelism of said optical beam which is incident upon said deflecting system, and (e) imaging position changing means for moving said optical system, said adjustor, said deflecting system and said scanning lens as one unit along an optical axis to change the imaging position of said optical beam.

4. The apparatus of claim 3, wherein said deflecting system includes a galvanometer.

5. The apparatus of claim 3, wherein said deflecting system includes a polygon mirror, and said apparatus further comprising:

(f) a first inclination compensation lens having a power only in a subscanning direction which is perpendicular to said main scanning direction and said optical axis, said first inclination compensation lens being disposed between said light source and said polygon mirror, said first inclination compensation lens compensating inclination of reflecting surfaces of said polygon mirror;

(g) a second inclination compensation lens having a power only in said subscanning direction, said second inclination compensation lens being disposed between said scanning lens and said scanning surface, said second inclination compensation lens compensating inclination of said reflecting surfaces of said polygon mirror; and (h) first moving means for inclination compensation which moves said first inclination compensation lens along said optical axis so that said light source and said reflecting surfaces of said polygon mirror are optically conjugate with each other in said subscanning direction.

6. The apparatus of claim 5, further comprising (i) imaging position changing means for moving said optical system, said adjustor, said first inclination compensation lens, said deflecting system and said scanning lens as one unit along said optical axis to thereby change the imaging position.

7. The apparatus of claim 6, further comprising (j) second moving means for inclination compensation which moves said second inclination compensation lens along said optical axis so that said reflecting surfaces and said scanning surface are optically conjugate with each other in said subscanning direction.

8. The apparatus of claim 5, further comprising (k) imaging position changing means for moving said deflecting system and said scanning lens as one unit along said optical axis to change the imaging position.

9. The apparatus of claim 8, wherein said light source includes a semiconductor laser device.

10. The apparatus of claim 9, wherein said adjustor includes a collimator lens.

11. The apparatus of claim 8, wherein said first and said second inclination compensation lenses are cylindrical lenses.

12. An optical beam scanning apparatus for scanning a scanning surface in a main scanning direction, comprising:

(a) an optical system, including a light source, which generates an optical beam;

(b) a deflecting system deflecting said optical beam;

(c) a scanning lens converging said optical beam on said scanning surface;

(d) an adjustor adjusting the degree of parallelism of said optical beam which is incident upon said deflecting system; and (e) an imaging position changing device moving said optical system, said adjustor, said deflecting system and said scanning lens as one unit along an optical axis to change the imaging position of said optical beam.

13. The apparatus of claim 12, wherein said deflecting system includes a galvanometer.

14. The apparatus of claim 12, wherein said deflecting system includes a polygon mirror, and said apparatus further comprising:

(f) a first inclination compensation lens having a power only in a subscanning direction which is perpendicular to said main scanning direction and said optical axis, said first inclination compensation lens being disposed between said light source and said polygon mirror, said first inclination compensation lens compensating inclination of reflecting surfaces of said polygon mirror;

(g) a second inclination compensation lens having a power only in said subscanning direction, said second inclination compensation lens being disposed between said scanning lens and said scanning surface, said second inclination compensation lens compensating inclination of said reflecting surfaces of said polygon mirror; and (h) a first moving device providing inclination compensation which moves said first inclination compensation lens along said optical axis so that said light source and said reflecting surfaces of said polygon mirror are optically conjugate with each other in aid subscanning direction.

15. The apparatus of claim 14, further comprising, (i) imaging position changing device moving said optical system, said adjustor, said first inclination compensation lens, said deflecting system and said scanning lens as one unit along said optical axis to thereby change the imaging position.

16. The apparatus of claim 15, further comprising, (j) second moving device providing inclination compensation which moves said second inclination compensation lens along said optical axis so that said reflecting surfaces and said scanning surface are optically conjugate with each other in said subscanning direction.

17. The apparatus of claim 14, further comprising, (k) imaging position changing device moving said deflecting system and said scanning lens as one unit along said optical axis to change the imaging position.

* * * * *